United States Patent [19]

Paul et al.

[11] Patent Number: 4,762,673

[45] Date of Patent: Aug. 9, 1988

[54] BURNABLE POISON ROD FOR USE IN A NUCLEAR REACTOR

[75] Inventors: Gary E. Paul, Monroeville; Ronald H. Carr, Swissvale; Lee W. Stern, Pittsburgh, all of Pa.

[73] Assignee: Westinghouse Electric Corp., Pittsburgh, Pa.

[21] Appl. No.: 4,016

[22] Filed: Jan. 16, 1987

Related U.S. Application Data

[62] Division of Ser. No. 594,156, Mar. 28, 1984, Pat. No. 4,696,793.

[51] Int. Cl.⁴ .............................................. G21C 7/04
[52] U.S. Cl. .................................................... 376/333
[58] Field of Search ............... 376/327, 333, 420, 423, 376/419, 447

[56] References Cited

U.S. PATENT DOCUMENTS

| | | |
|---|---|---|
| 3,072,549 | 1/1963 | Koutz et al. ...................... 376/419 |
| 3,119,747 | 1/1964 | Wallace et al. ................... 376/447 |
| 3,211,627 | 10/1965 | Thorp, II ........................ 376/420 |
| 3,510,398 | 5/1970 | Wood .............................. 376/327 |
| 3,745,069 | 7/1973 | Sofer et al. ..................... 376/447 |
| 4,273,616 | 6/1981 | Andrews .......................... 376/420 |
| 4,342,722 | 8/1982 | Blum .............................. 376/327 |
| 4,420,458 | 12/1983 | Dunlap et al. .................... 376/447 |

FOREIGN PATENT DOCUMENTS

| | | |
|---|---|---|
| 682057 | 3/1964 | Canada ............................ 376/419 |
| 0022693 | 2/1977 | Japan ............................. 376/333 |

*Primary Examiner*—Harvey E. Behrend

[57] ABSTRACT

A burnable poison rod for use in a nuclear reactor comprises a metallic tube with upper and lower closure means, a neutron absorber positioned within the cladding and a neutron moderating spacer means positioning the neutron absorber in spaced relation to the lower closure means. The neutron moderating spacing means can comprise a solid neutron moderating material, or a liquid coolant moderator contained within the lower section of the cladding with a sealing plug positioned between the neutron absorber and the liquid coolant moderator.

11 Claims, 2 Drawing Sheets

BURNABLE POISON ROD FOR USE IN A NUCLEAR REACTOR

This is a division of application Ser. No. 594,156 filed Mar. 28, 1984, now U.S. Pat. No. 4,696,793.

BACKGROUND OF THE INVENTION

This present invention relates to burnable poison rods for use in a nuclear reactor and to a fuel assembly of a nuclear reactor containing such rods.

It is well-known that the process of nuclear fission involves the disintegration of the fissionable nuclear fuel material into two or more fission products of lower mass number. Among other things the process also includes a net increase in the number of available free neutrons which are the basis for a self-sustaining reaction. When a reactor has operated over a period of time the fuel assembly with fissionable material must ultimately be replaced due to depletion. Inasmuch as the process of replacement is time consuming and costly, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as "burnable poisons" or "burnable absorbers" if they have a high probability (or cross section) for absorbing neutrons while producing no new or additional neutrons or changing into new absorbers as a result of neutron absorption. During reactor operation the burnable absorbers are progressively reduced in amount so that there is a compensation made with respect to the concomitant reduction in the fissionable material.

The life of a fuel assembly may be extended by combining an initially larger amount of fissionable material as well as a calculated amount of burnable absorber. During the early stages of operation of such a fuel assembly, excessive neutrons are absorbed by the burnable absorber which undergoes transformation to elements of low neutron cross section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fuel and burnable absorber in carefully proportioned quantity, an extended fuel assembly life can be achieved with relatively constant neutron production and reactivity.

Burnable absorbers which may be used include boron, gadolinium, samarium, europium, and the like, which upon the absorption of neutrons result in isotopes of sufficiently low neutron capture cross section so as to be substantially transparent to neutrons.

The incorporation of burnable absorber in fuel assemblies has been recognized in the nuclear fuel as an effective means of increasing fuel capacity and thereby extending core life. Burnable absorbers are used either uniformly mixed with the fuel (i.e., distributed aborber) or are placed discretely as separate elements in the reactor, so arranged that they burn out or are depleted at about the same rate as the fuel. Thus, the net reactivity of the core is maintained relatively constant over the active life of the core.

When the burnable absorbers are placed as discretely separate elements in the reactor, the same are normally contained in a burnable poison rod, and the rods inserted into empty control rod guide thimbles in the fuel assembly. Control rods are not required in all guide thimbles of all fuel assemblies, thus allowing for the use of burnable poison rods.

In U.S. Pat. No. 4,342,722, there is described prior art burnable poison rods and a specific rod is disclosed which contains sections of boron glass. That rod contains a plurality of sections of boron glass tubes, and provides for the joints between the tube sections to be outside the zone of maximum flux density. The rod described is, however, of a full length design, such rods being on the order of 8–14 feet in length.

Situations arise where a part length burnable poison rod is desirable. In such part length rods, the neutron absorber must be reduced in amount and the absorber must be repositioned near the center of the core height. One proposed design of a part length burnable poison rod is a shortened version of a full length burnable poison rod containing a shortened length of burnable absorber. This design, due to its shorter length, however, is not compatible with present handling equipment. If costly handling equipment modifications are to be avoided, a part length burnable poison rod is needed which has the dimensions of conventional full length burnable poision rods.

SUMMARY OF THE INVENTION

A burnable poison rod for use in a nuclear reactor comprises a tubular metallic cladding and upper and lower closure means. A neutron absorber, or burnable absorber, is positioned within the tubular cladding and is spaced from the lower closure means by use of a neutron moderating spacing means. The neutron moderating spacing means can comprise a solid mass of a neutron moderating material, or the spacing means can comprise a lower section of the rod in which water or other liquid coolant acts as the moderator, and an intermediate sealing plug provided to seal the neutron absorber from the neutron moderator. Preferably, the neutron absorber comprises a borosilicate glass tube that is held in spaced relation to the bottom closure means of the cladding by the neutron moderating spacing means.

DETAILED DESCRIPTION

The present invention provides a burnable poison rod that is of the normal length of such rods but which acts in the manner of a part-length burnable poison rod.

The rod, as is conventional, comprises a metallic tube or cladding that is formed from stainless steel or a zirconium alloy such as zircaloy. The rod has upper and lower closure means in the form of end plugs.

Positioned within the cladding is a neutron absorber or burnable poison which absorbs excess neutrons. These neutron absorbers are known in the art, and include boron, such a boron carbide or a boron carbide-aluminum oxide mixture, gadolinium, samarium, europium and the like. A preferred neutron absorber comprises borosilicate glass in the form of a tube which fits within the tubular cladding.

In the burnable poison rod of the present invention, the neutron absorber is spaced from the bottom closure means of the rod by a neutron moderating spacing means which may be in the form of a solid mass or a contained liquid mass. Neutron moderators are materials which will slow down neutrons, but do not absorb the same as do neutron absorbers, and are also known in the art.

In embodiments of the present invention where a solid mass of a neutron moderator is used as the neutron moderating spacing means, graphite, carbon, or beryllium, or the like are usable. In embodiments of the present invention where a liquid neutron moderating means is used, the lower closure means or end plug has an aperture therein and the side wall of the lower section of the cladding has apertures therein, such that the lower section is filled with coolant of the reactor, such as water. An intermediate or sealing plug is provided to seal the lower section of the burnable poison rod from the neutron absorber contained therein. The liquid coolant will flow into the lower section of the rod and is contained therein to act as a neutron moderator. While actual continuous flow of the water through the rod is not effected, the apertures prevent stagnation of the contained water.

Figure 1:
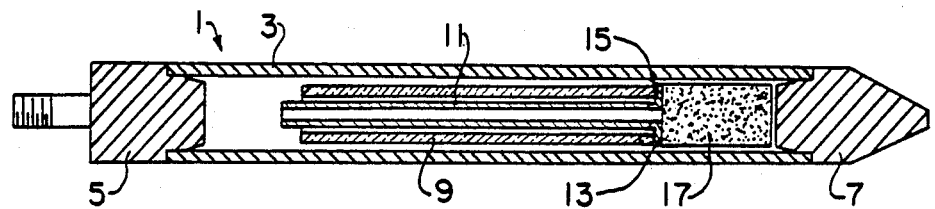
FIG. 1 is a cross-sectional view of one embodiment of a burnable poison rod of the present invention.

In FIG. 1, there is illustrated an embodiment of the burnable poison rod of the present invention. As illustrated, the rod 1 has a tubular metallic cladding 3 and upper and lower closure means 5 and 7 respectively. Positioned within the tubular cladding 3 is a neutron absorber 9 such as a borosilicate tube. Centered within the borosilicate tube 9 is a stainless steel spacer tube 11, the tube 11 having a radially outwardly directed flange 13 therein, upon which the bottom end 15 of the borosilicate tube 9 will rest.

A neutron moderating spacing means is provided within the metallic cladding 3, which spacing means comprises a solid mass 17, of cylindrical shape, of a neutron moderating material. This neutron moderating spacing means 17 positions the borosilicate glass tube 9 in spaced relation to the lower closure means 7 and acts to moderate fast neutrons. The length of the cylinder of neutron moderator 17 is determined by the distance from the lower closure means that it is desired to position the neutron absorber, or borosilicate glass tube 9.

Figure 2:
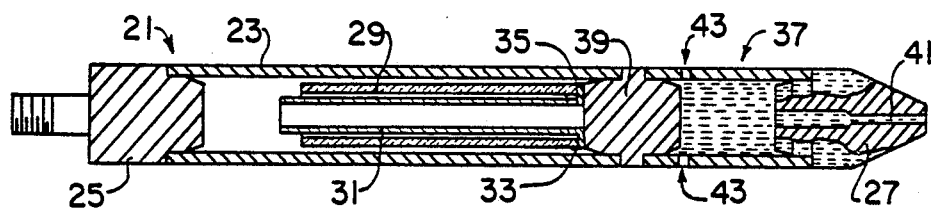
FIG. 2 is a cross-sectional view of another embodiment of a burnable poison rod of the present invention.

Another embodiment of the present invention is illustrated in FIG. 2. As illustrated, the rod 21 has a tubular metallic cladding 23 and upper and lower closure means 25 and 27 respectively. Positioned within the tubular cladding 3 is a neutron absorber 29, shown as a borosilicate glass tube. As with the previous embodiment, a stainless steel spacer tube 31 may be centered in the borosilicate tube 29, the spacer tube having an outwardly directed flange 33 thereon, upon which the bottom end 35 of the borosilicate tube will rest.

A neutron moderating spacing means is provided within the metallic cladding 23 which comprises a lower section 37 of the rod adapted to contain water or other neutron moderating liquid, the lower section 37 sealed from the neutron absorber 29 by means of a sealing plug 39. The sealing plug 39 may divide the cladding into separate sections along its length as illustrated, or it may fit within grooves in the interior wall of the cladding. The lower closure means 27 comprises an end plug having an axial aperture 41 therethrough which communicates with the interior of the lower section 37 of the tubular cladding 23. A plurality of apertures 43 are also provided through the wall of the cladding 23 at the lower section 37 thereof. The apertures 41 and 43 provide for the containment of water or other liquid coolant within the lower section 37 to act as a neutron moderator, while the sealing plug 39 positions the neutron absorber in spaced relationship to the lower closure means 27.

Figure 3:
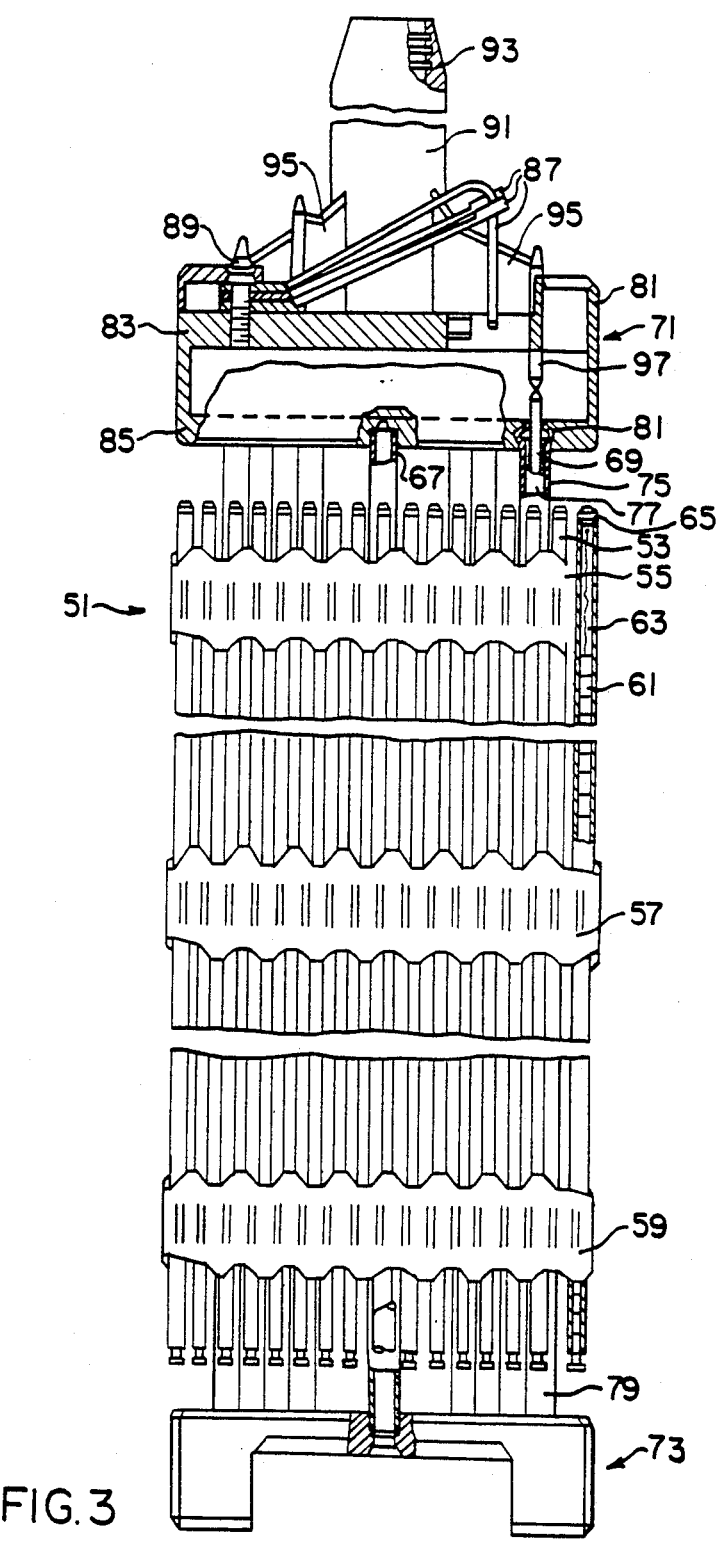
FIG. 3 is a view in elevation, partially in section, illustrating a fuel assembly which incorporates the burnable poison rod of the present invention.

The burnable poison rods of the present invention are usable in a nuclear fuel assembly using conventional handling equipment. As illustrated in FIG. 3, a nuclear fuel assembly 51 includes an array fuel rods 53 held in spaced relationship to each other by grids 55, 57 and 59 (only three of which are shown in FIG. 3) spaced along the fuel assembly length. Each fuel rod includes nuclear fuel pellets 61 and a spring 63 located in the plenum of each fuel rod, and the ends of the rods are closed by end plugs 65, all in a conventional manner.

To control the fission process, a multiplicity of control rods 67 or burnable poison rods 69, are reciprocally movable in control rod guide tubes or guide thimbles located at predetermined positions in each selected fuel assembly in the reactor. The guide thimbles are attached to the grids 55, 57 and 59. The reactor includes a top nozzle 71 and a bottom nozzle 73 to which opposite ends of the control rod guide thimbles are attached to form an integral assembly capable of being conventionally handled without damaging the assembly components.

Typically, the guide thimbles have sleeves for weld compatibility with the upper 55 and lower 59 grids and with the top 71 and bottom 73 nozzles. In this case, a sleeve 75 is used to join the guide thimble 77 to the upper grid 57 and the top nozzle 71. Each guide thimble 77 extends the full length of the fuel assembly 51 between the top nozzle 71 and the bottom nozzle 73. The sleeve 75 only extends from the top nozzle 71 to the upper grid 55, and the sleeve 79 only extends from the bottom nozzle 73 to the lower grid 59. The guide thimble 77 is attached to the sleeve 75 by a bulge fit. The guide thimble 77 is attached to the sleeve 79.

As illustrated, the top nozzle is square in cross section and comprises a housing 81 having an upper plate 83 spaced from a (lower) adapter plate 85. Assembly holddown springs 87 attached to opposite sides of upper plate 83 are held in place by bolts 89 and are adapted to be compressed when the reactor upper core plate (not shown) is placed in position. The top nozzle further includes a rod cluster control assembly 91 comprising an internally threaded cylindrical member 93 having radially extending flukes or arms 95. A connector 97 interconnects each control rod 67 or burnable poison rod 69 with the arms, the arrangement being such that the rod cluster assembly positions the control rods and burnable poison rods vertically in the rod guide thimbles to thereby control the fission process in the assembly.

There has been described a burnable poison rod which contains a neutron absorber spaced from the bottom closure means of the rod by a neutron moderating spacing means. The use of the neutron moderating spacing means axially positions the neutron absorber within the rod at a spaced location from the bottom closure for the rod, minimizes the displacement of the neutron moderator, and maintains a proper overall length for the burnable poison rod required for compatability with existing rod handling equipment.

What is claimed is:

1. A nonfuel burnable poison rod for use in a nuclear reactor, said nonfuel burnable poison rod comprising:
   (a) a tubular metallic cladding having upper and lower closure means, said lower closure means sealing the lower portion of said tubular cladding;
   (b a neutron absorber in the form of an outer tube positioned concentrically within said tubular metallic cladding;
   (c) a neutron moderating spacing means for positioning said outer neutron absorber tube in spaced relation to said lower closure means, said neutron moderating spacing means being in the form of a solid cylindrical mass of a neutron moderating material; and
   (d) support means in the form of an inner metallic tube concentrically disposed within said outer neutron absorber tube and resting on said solid cylindrical mass of neutron moderating material.

2. A rod as defined in claim 1 wherein said inner tube has a radial flange thereon, which flange seats between said outer tube and said solid cylindrical mass.

3. A rod as defined in claim 5 wherein said outer neutron absorber tube comprises a tube of borosilicate glass.

4. A rod as defined in claim 5 wherein said inner tube is composed of stainless steel.

5. A rod as defined in claim 1 wherein said cylindrical mass of neutron moderating material is selected from the group consisting of graphite, carbon, and beryllium.

6. A rod as defined in claim 1 wherein said tubular metallic cladding is formed from a metal selected from the group consisting of stainless steel and zircaloy.

7. A nonfuel poison rod for use in a nuclear reactor, said nonfuel burnable poison rod comprising:
   (a) a tubular cladding having upper and lower closure means, said lower closure means being in the form of an end plug having an aperture therethrough, a lower section of said tubular cladding having apertures provided therein;
   (b) a neutron absorber in the form of an outer tube positioned concentrically within said tubular cladding;
   (c) a sealing plug disposed within said tubular cladding between said lower section thereof and said neutron absorber and spaced above said lower end plug so as to define together with said lower section of said tubular cladding a neutron moderator-receiving chamber located above said lower end plug, said apertures in said lower end plug and said tubular cladding lower section leading into and from said chamber; and
   (d) support means in the form of an inner metallic tube concentrically disposed within said outer neutron absorber tube and resting on said sealing plug.

8. A rod as defined in claim 7 wherein said inner tube has a radial flange thereon, which flange seats between said outer tube and said sealing plug.

9. A rod as defined in claim 8 wherein said outer neutron absorber tube comprises a tube of borosilicate glass.

10. A rod as defined in claim 8 wherein said inner tube is composed of stainless steel.

11. A rod as defined in claim 7 wherein said tubular metallic cladding is formed from a metal selected from the group consisting of stainless steel and zircaloy.

* * * * *